G. A. CURRIER.
ROTARY PLOW.
APPLICATION FILED FEB. 2, 1918.

1,349,875.

Patented Aug. 17, 1920.

INVENTOR.
George A. Currier
BY
E. E. Huffman
ATTORNEY.

UNITED STATES PATENT OFFICE.

GEORGE A. CURRIER, OF ST. LOUIS, MISSOURI.

ROTARY PLOW.

1,349,875.  Specification of Letters Patent.  Patented Aug. 17, 1920.

Application filed February 2, 1918. Serial No. 215,025.

*To all whom it may concern:*

Be it known that I, GEORGE A. CURRIER, a citizen of the United States of America, residing at the city of St. Louis, State of Missouri, United States of America, have invented a certain new and useful Rotary Plow, of which the following is such a full, clear, and exact description as will enable any one skilled in the art to which it appertains to make and use the same, reference being had to the accompanying drawings, forming part of this specification.

My invention relates to a rotary power-driven plow, and particularly to an improved arrangement of the plowing blades or teeth, whereby the power consumption is substantially steady and continuous, the number of plowing blades in contact with the soil being substantially constant through the entire revolution of the plow. In addition to the advantage of even and steady power consumption made possible by my improved form of plow, shocks and strains due to simultaneously striking of the soil by a number of blades are eliminated.

I also prefer to arrange the plowing blades with their faces at an oblique angle to the direction of travel of the plow, and place the blades in each row contiguous to each other to form continuous soil moving surfaces at an angle to the direction of the travel of the plow to secure somewhat the same "scouring" effect existing in the ordinary mold-board plow. Automatically operating plow scraping mechanism is also provided.

Figure 1:
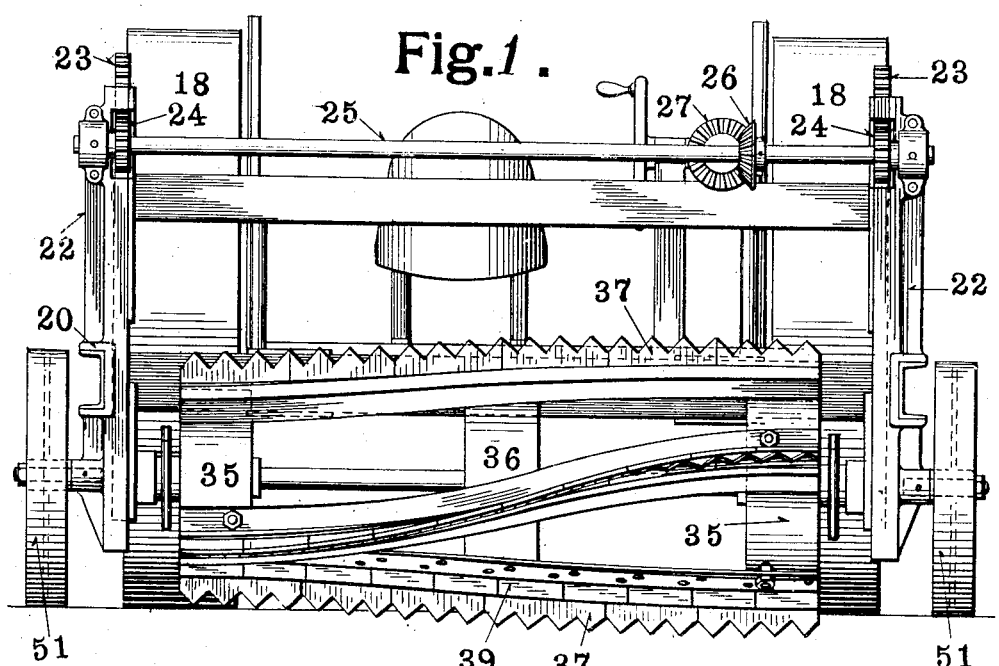
Figure 2:
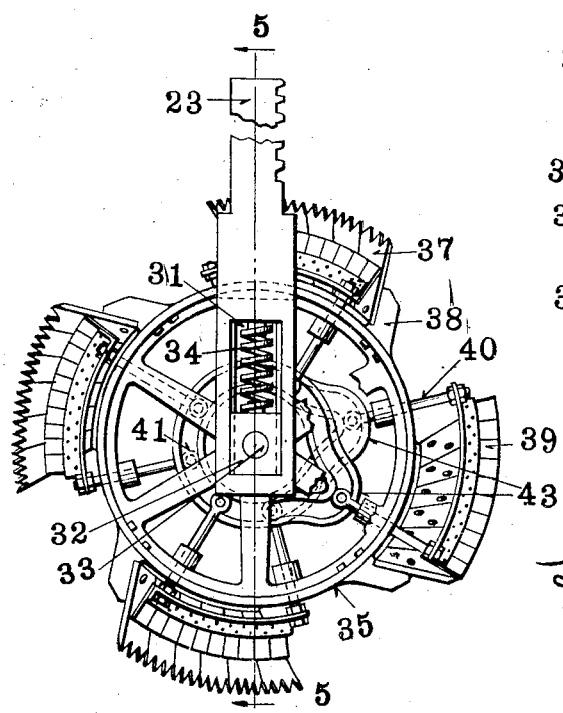
Figure 3:
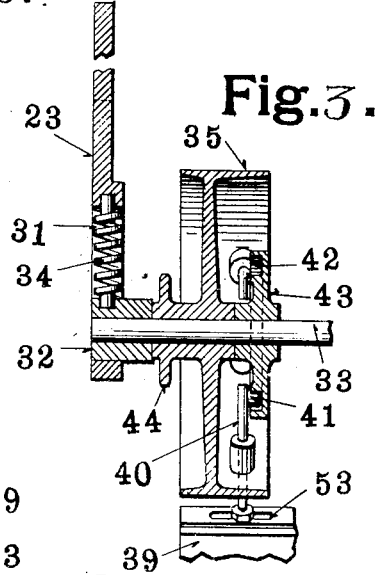

Other objects and advantages of my invention will appear from the following detailed description in connection with the accompanying drawings, in which Figure 1 is a rear elevation; Fig. 2 is an enlarged detail view of the plow; and Fig. 3 is a sectional view on the line 5—5 of Fig. 2.

Like marks of reference refer to similar parts in the several views of the drawings.

Carried by a frame 20 are a pair of uprights 22, provided with ways in which slide rack bars 23. The teeth of these rack bars 23 are engaged by pinions 24, mounted upon a shaft 25. This shaft 25 is provided with a bevel geared wheel 26, meshing with a bevel geared wheel 27. This wheel is operated from a hand wheel (not shown), so that when the hand wheel is turned in one direction the shaft 25 will be operated from the gearing just described to raise the rack bars 23 which carry the plow. When operated in the opposite direction the said bars will be lowered, together with the plow.

Each of the rack bars 23 is provided at its lower end with a slot 31, in which slides a block 32. In this block 32 is non-rotatably mounted a shaft 33. A spring 34 is placed between the upper face of the slot 31 and the end of the block 32, so as to allow yielding of the plow when encountering hard objects. Rotatably mounted upon the shaft 33 are a pair of cylindrical members 35, shown in detail in Figs. 2 and 3. Secured to these members 35 and a central cylindrical member 36 are plow blades 37, which are spirally arranged, and are preferably made up of a number of separated pieces, so that the breakage of one of the blades will not necessitate the renewal of the entire blade. The blades 37 are secured to supports 38, which are bolted to the members 35 and 36. In order to scrape the blades 37 I arrange adjacent to each of said blades a correspondingly shaped scraper 39, which is preferably also formed of a plurality of pieces. Each of the scrapers 39 is carried on a pair of radially sliding rods 40, passing through the cylindrical member 35. The inner ends of these rods are provided with bearings 41 engaging with a cam track 42 carried in a member 43 rigidly secured to the non-rotatable shaft 33. It will be evident that when the plow is rotated each of the scrapers 39 will be forced outwardly by the action of the cam 43 once during each revolution of the plow. The point at which this takes place is preferably about that shown in Fig. 2 of the drawings. As the pair of rods 40 carrying the scraper are not parallel the scraper is provided with a slot 53 to compensate for the difference in distance between the ends of the rods 40 in their normal and extended positions.

The blades being spirally arranged, will not come in contact with the ground all at one time—one end of said blades will make contact with the ground first, and then progressively to the opposite end. In this manner shock to the machine is avoided and at the same time the blades will enter the ground more readily than if straight blades were used. When the blades are raised out of the ground any adhering earth will be removed by means of the scraper 39.

It will be evident that my plow, while simple in construction, is effective in operation, and thoroughly plows and pulverizes the ground to any required depth.

Having fully described my invention what I claim as new and desire to secure by Letters Patent of the United States is:

1. In a plow, the combination with a rotary member, of a plowing blade spirally arranged thereon, a scraper for said blade, and a pair of radially moving arms actuating said scraper, one of said arms having sliding connection with said scraper.

2. In a plow, the combination with a rotary member, of a plowing blade spirally arranged thereon, a scraper for said blade, a pair of stationary cams arranged out of alinement, and a pair of radially moving arms angularly arranged with respect to each other, said arms being operated from said cams and connected with said scraper.

3. In a plow, the combination with a rotary member, of a plowing blade spirally arranged thereon, a scraper for said blade, a pair of stationary cams arranged out of alinement, and a pair of radially moving arms angularly arranged with respect to each other, said arms being operated from said cams and one of said arms having sliding connection with said scraper.

In testimony whereof, I have hereunto set my hand and affixed my seal.

GEORGE A. CURRIER. [L. S.]